United States Patent [19]
Honda

[11] 3,757,882
[45] Sept. 11, 1973

[54] MOTORCYCLE WHICH CAN BE DISASSEMBLED INTO FRONT AND REAR SUBASSEMBLIES

[75] Inventor: Soichiro Honda, Tokyo, Japan

[73] Assignee: Honda Giken Kogyo Kabushiki Kaisha, Tokyo, Japan

[22] Filed: Oct. 5, 1970

[21] Appl. No.: 77,850

[30] Foreign Application Priority Data
Oct. 3, 1969 Japan.................................. 44/78635

[52] U.S. Cl.............. 180/33 R, 280/47.12, 280/278, 280/287, 280/302
[51] Int. Cl.............................................. B62k 15/00
[58] Field of Search............................ 180/33, 29, 30; 280/278, 287, 302, 303, 47.12, 87.05, 63

[56] References Cited
UNITED STATES PATENTS

| | | | |
|---|---|---|---|
| 3,354,975 | 11/1967 | Stuart | 280/278 |
| 3,039,792 | 6/1962 | Wood et al. | 280/302 |
| 3,042,132 | 7/1962 | Bouffort | 280/278 X |
| 2,861,815 | 11/1958 | Willinger | 280/278 |

*Primary Examiner*—Kenneth H. Betts
*Assistant Examiner*—John P. Silverstrim
*Attorney*—Waters, Roditi, Schwartz & Nissen

[57] ABSTRACT

A motorcycle with rear wheel drive is constructed with a front subassembly having a front fork carrying a front wheel separably connected to a vehicle frame on a rear subassembly. The frame is provided with an arch-shaped support stand at such a position that the center of gravity of the connected subassemblies is forward of the support stand while the center of gravity of the rear subassembly alone is rearward of the support stand.

11 Claims, 6 Drawing Figures

3,757,882

MOTORCYCLE WHICH CAN BE DISASSEMBLED INTO FRONT AND REAR SUBASSEMBLIES

BRIEF SUMMARY OF THE INVENTION

This invention relates to a motorcycle which can be easily carried in the trunk of a passenger motorcar and which a driver can remove therefrom and use in otherwise inaccessible regions for motorcars, for instance, in mountainous regions or the like.

More particularly, the invention contemplates a motorcycle which can be easily carried in and out of the motorcar trunk and can be disassembled to facilitate this operation. Additionally, the motorcycle can be easily assembled and can provide, after assembly, a size large enough for safe driving.

According to this invention, the motorcycle comprises front and rear subassemblies, the front subassembly including a front wheel, the rear subassembly including a rear wheel, means on said subassemblies for detachably connecting the same together, and a support stand on the rear subassembly positioned thereon such that the center of gravity of the rear subassembly alone is rearward of the stand whereas the center of gravity of the connected subassemblies is forward of the stand.

According to another feature of this invention, the front subassembly carries a head lamp and a steering handle, and a lead wire connecting the head lamp and an electric source provided on the rear subassembly is provided at an intermediate portion thereof with a separable type coupler. A Bowden wire connecting an operation member on the handle and a throttle valve of an engine provided on the rear subassembly is also provided at an intermediate portion thereof with a separable type coupler.

DETAILED DESCRIPTION

Figure 1:
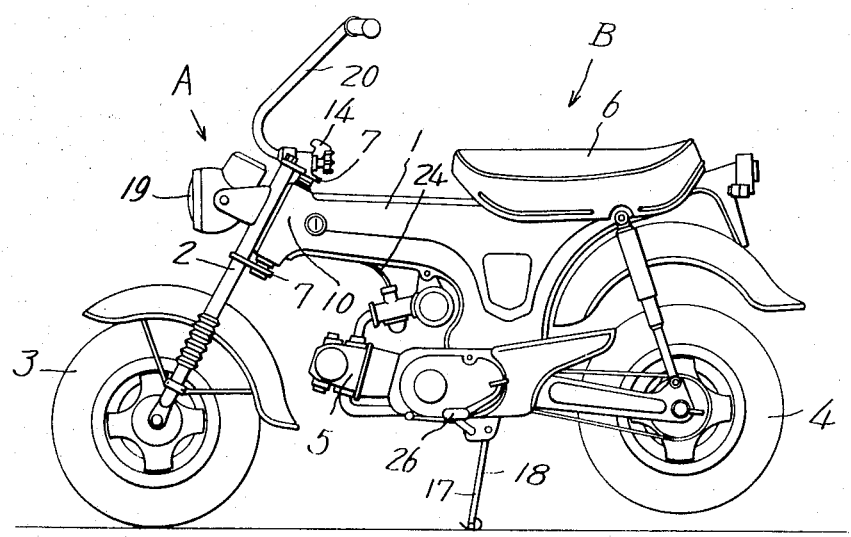
FIG. 1 is a side elevational view of a motorcycle according to this invention.

FIG. 1 shows the motorcycle of the invention in an assembled state. This motorcycle as is conventional, comprises a vehicle body frame 1 having a front fork 2 carrying a front wheel 3, a rear wheel 4, an internal combustion engine 5 for driving the rear wheel 4, and a seat 6 for a driver.

This motorcycle is desirably comparatively small in size so that it can be housed in the trunk of a passenger car while it also is comparatively large in size so that it can be removed from the trunk and stably driven. For satisfying these contradictory requirements, the motorcycle is of such size, that the wheel base thereof between the front and rear wheels 3 and 4 is about 1 meter and the height of seat 6 from the ground is about 0.7 meter. The tires are 3.50-10. The engine 5 has a displacement of 49 cc and 4.5 PS in output power, so that the vehicle can be driven stably at a speed of 70 Kms/hr.

Figure 2:
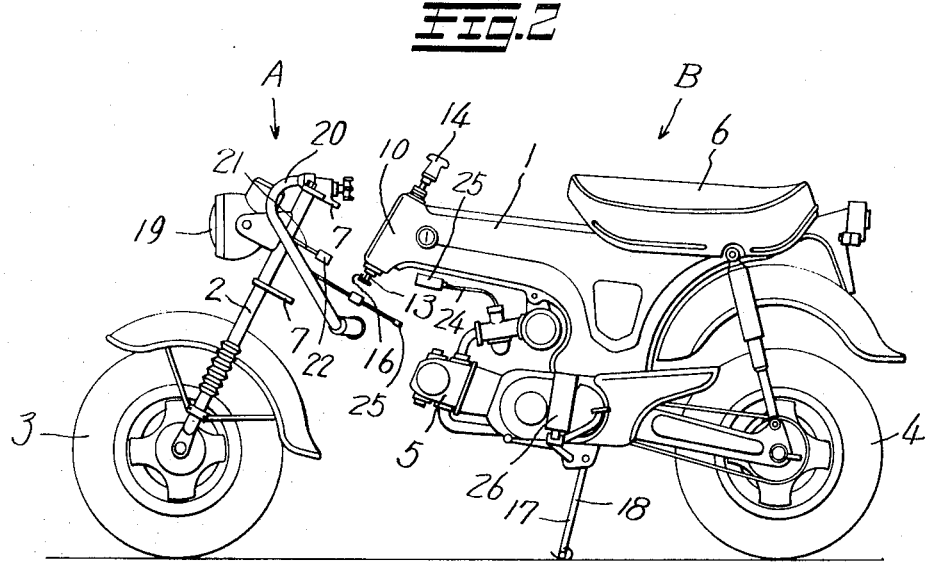
FIG. 2 is a side elevational view thereof in disassembled state.
Figure 5:
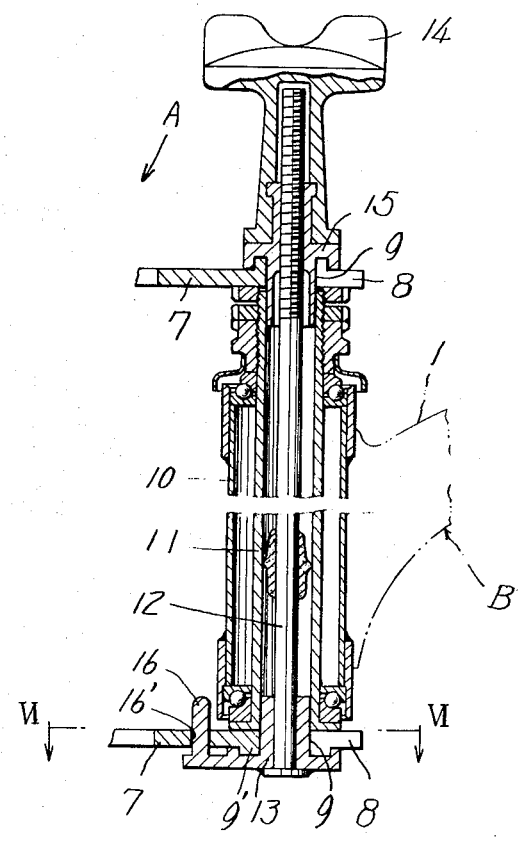
FIG. 5 is an enlarged sectional side view of a connecting portion of the motorcycle.
Figure 6:
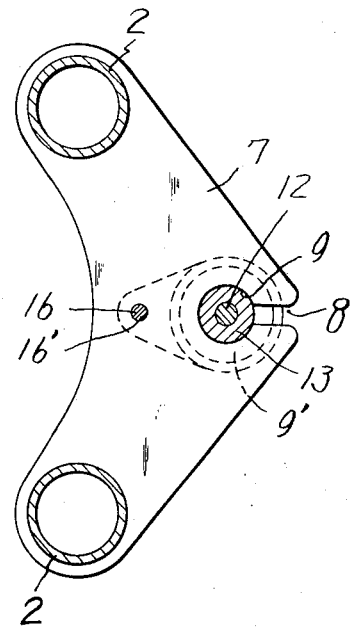
FIG. 6 is a sectional view taken along the line VI—VI in FIG. 5.

This motorcycle is constructed, as shown in FIG. 2, so that it can be separated into a front subassembly A comprising the front fork 2 carrying the front wheel 3 and a rear subassembly B comprising the vehicle frame 1 supporting the rear wheel 4, the engine 5, the seat 6 and the remaining structure. As a consequence of the disassembly of the motorcycle it can be housed in the trunk of a passenger car and also can be taken out therefrom and assembled as shown in FIG. 1. A connecting portion thereof is clearly shown in FIGS. 5 and 6, and specifically the front subassembly A is provided with a pair of upper and lower flanges 7 projecting rearwardly each flange 7 being provided with an opening 9 which is accessible externally through a guide groove 8. The rear subassembly B is provided at its front end with a head pipe 10, a rotatable steering stem 11 inserted through and supported by the pipe 10, and a central screw rod 12 inserted through the stem 11. A positioning member 13 with a flange is fixed to the lower end of the screw rod 12, and a positioning member 15 with a flange is in threaded engagement with the upper end of the screw rod 12 so as to be rotatable by a knob 14 integral therewith. From the condition in which the two members 13 and 15 are fully spaced apart from each other by rotating the knob 14 in the loosening direction, the screw rod 12 is inserted in the openings 9 through the respective guide grooves 8 and then the two members 13 and 15 are mounted in the openings 9 by rotating the knob 14 in the tightening direction. Thus the stem 11 can be fixed to the front subassembly by being tightened between the flanges 7 by the flanges of the two positioning members 13 and 15. This fixation can be released if, from this condition, the knob 14 is again rotated in the loosening direction. Numeral 16 denotes a pin on the lower member 13 for prevention of rotation, and numeral 16' denotes an opening for receiving the pin 16. Projecting walls 9' are provided around the periphery of the openings 9 so that the members 13 and 15 can be mounted thereon at their facing grooves 13' and 15'.

Figure 3:
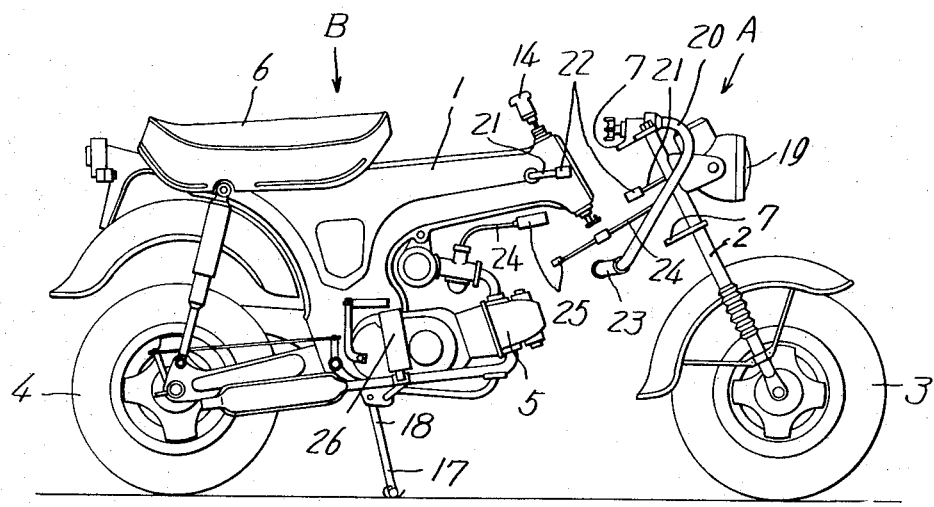
FIG. 3 is a side elevational view of the motorcycle of FIG. 2 as viewed from the opposite side.
Figure 4:
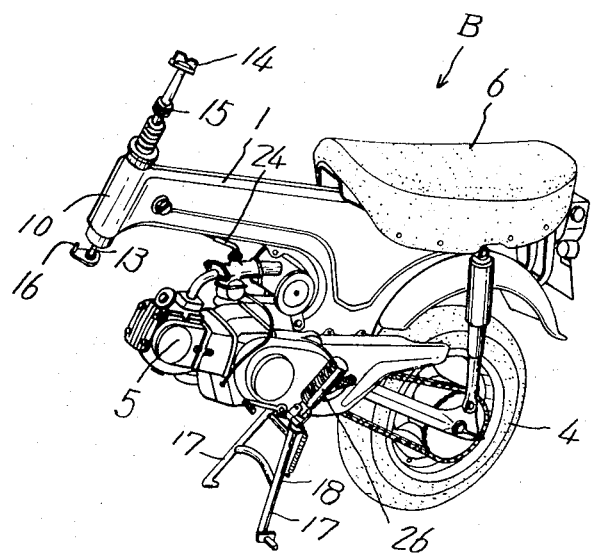
FIG. 4 is a perspective view of a rear subassembly of the motorcycle.

By way of example, the motorcycle is provided at the rear subassembly B, below the engine 5, with a conventional arch-shaped stand 18 having a pair of right and left legs 17, but the attaching position thereof is selected as follows:

The stand 18 is positioned at such a fulcrum position that the weight on the front side becomes larger as shown in FIG. 1 when the rear subassembly B has been connected to the front subassembly A, but the weight on the rear side becomes larger as shown in FIGS. 2 and 3 when the rear subassembly B has been separated from the subassembly A. More particularly, when the subassemblies are connected together, the center of gravity thereof is located forwardly of stand 18, whereas the rear subassembly itself has a center of gravity rearward of stand 18.

Accordingly, in the condition in which the two subassemblies A and B are connected together, the whole vehicle body is slightly inclined forward about the stand 18 constituting a fulcrum and the front wheel 3 is in contact with the ground and the rear wheel 4 constituting the driving wheel is raised, as shown in FIG. 1, so that the adjustment and inspection of the engine 5 and the power transmission system connected thereto can be easily effected. In the condition in which the two subassemblies A and B are disconnected, the rear subassembly B is slightly inclined rearward about the stand 18 constituting a fulcrum, and the rear wheel 4 is in contact with the ground as shown in FIGS. 2 and 3, so that the engine 5 is prevented from being damaged by rapidly coming in contact with the ground. It is not required during the assembly operation to lift the rear subassembly B manually and it becomes possible for a single person to perform this operation.

The front subassembly A has a head lamp 19, a steering handle 20, and a lead wire 21 connecting the lamp 19 with an electric source on the rear subassembly B via separable type coupler 22. A Bowden wire 24 connects an operation member 23 on the handle 20 with a throttle valve of the engine 5 via a separable type coupler 25. Accordingly, the lead wire 21 and the Bowden wire 24 can be connected and disconnected at will and this facilitates the asembling and disassembling of the vehicle body, and makes possible the use of a throttle valve operation member on the handle 20 in the form of a grip type, as in conventional motorcycles while also making it possible to drive the motorcycle at night.

The steering handle 20 and a step 26 are desirably formed as foldable members.

Thus, according to this invention, the motorcycle is separable into front and rear subassemblies so that the motorcycle can be carried in a passenger car trunk, it being possible to house the motorcycle in the trunk comparatively easily even if each subassembly is comparatively large in size. Furthermore by using the stand as a fulcrum, the adjustment and inspection of the engine and the like after assembly can be easily effected and the assembling operation can be carried out simply by a single person. Additionally, the size of the motorcycle is comparatively large so that it has good stability when running. According to a further feature of this invention, the engine throttle valve can be operated at the handle and driving at night is possible, and there is no difficulty in assembling and disassembling.

What is claimed is:

1. A motorcycle comprising front and rear subassemblies, the front subassembly including a front wheel, the rear subassembly including a rear wheel and an engine, means on said subassemblies for detachably connecting the same together, and a pivotable support stand on the rear subassembly positioned thereon such that the center of gravity of the rear subassembly alone is rearward of the stand whereas the center of gravity of the connected subassemblies is forward of the stand, said support stand adapted to maintain said rear wheel in raised position in one mode thereof upon connection of said front and rear subassemblies and in ground-contacting position upon disconnection of said subassemblies.

2. A motorcycle as claimed in claim 1 wherein the rear subassembly includes a seat, said motorcycle having a wheelbase of about 1 meter and a seat height of about 0.7 meter.

3. A motorcycle as claimed in claim 1 wherein said support stand constitutes a pivotal support for the subassemblies and serves as a fulcrum for tilting movement when the subassemblies are connected and disconnected.

4. A motorcycle as claimed in claim 1 further comprising throttle control means for said engine on the front subassembly, and separable connection means for coupling the engine and the throttle control means.

5. A motorcycle as claimed in claim 4 further comprising a headlamp on the front subassembly, a power source for said headlamp on the rear subassembly, and separable connection means for coupling the headlamp and power source.

6. A motorcycle as claimed in claim 1 wherein said front subassembly comprises a front fork carrying said front wheel, a pair of spaced flanges on said front fork and means for clamping a portion of the rear subassembly between the flanges.

7. A motorcycle as claimed in claim 6 wherein the means for detachably connecting the subassemblies further comprises a threaded rod on said rear subassembly, a first positioning member fitted on said rod for being non-rotatably coupled to one of the flanges, a second positioning member threaded on said rod and engageable with the other flange, a steering stem clampable between said flanges by rotating said rod, and a head pipe rotatably supported on said stem and fixed to said rear subassembly.

8. A motorcycle as claimed in claim 7 wherein said flanges have openings with guide grooves leading externally of the flanges, said rod being insertable into said openings through said guide grooves.

9. A motorcycle as claimed in claim 8 wherein said opening in each flange is comparatively large in diameter and the guide groove is comparatively small in width, each positioning member being comparatively large in diameter and mountable in the corresponding opening, said rod being comparatively small in diameter so as to be insertable through each guide groove.

10. A motorcycle as claimed in claim 8 wherein the second positioning member is fixed to the upper end of said rod, said first positioning member and the flange facing the first positioning member respectively including a pin and a pin opening receiving the pin to prevent relative rotation.

11. A motorcycle as claimed in claim 8 comprising an integral knob connected to said second positioning member.

* * * * *